(12) United States Patent
Kim et al.

(10) Patent No.: US 8,340,297 B2
(45) Date of Patent: Dec. 25, 2012

(54) METHOD AND APPARATUS FOR EFFICIENTLY PROVIDING LOCATION OF CONTENTS ENCRYPTION KEY

(75) Inventors: Yeo-jin Kim, Suwon-si (KR); Yun-sang Oh, Seoul (KR); Sang-gyoo Sim, Suwon-si (KR); Kyung-im Jung, Seongnam-si (KR); Ji-soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1019 days.

(21) Appl. No.: 11/745,675

(22) Filed: May 8, 2007

(65) Prior Publication Data

US 2007/0266243 A1    Nov. 15, 2007

Related U.S. Application Data

(60) Provisional application No. 60/799,652, filed on May 12, 2006.

(30) Foreign Application Priority Data

Apr. 17, 2007   (KR) .................. 10-2007-0037396

(51) Int. Cl.
*H04L 29/06* (2006.01)
(52) U.S. Cl. .................. 380/277; 380/201; 713/167
(58) Field of Classification Search .................. 713/167
See application file for complete search history.

(56) References Cited

U.S. PATENT DOCUMENTS

| | | | | |
|---|---|---|---|---|
| 7,814,173 | B2 * | 10/2010 | Yamagishi et al. | ........... 709/219 |
| 2005/0187899 | A1 | 8/2005 | Odagiri et al. | |
| 2005/0234907 | A1 * | 10/2005 | Yamagishi et al. | ............... 707/5 |
| 2005/0271205 | A1 * | 12/2005 | Shen et al. | ..................... 380/201 |
| 2006/0062426 | A1 * | 3/2006 | Levy et al. | ..................... 382/100 |
| 2006/0232449 | A1 * | 10/2006 | Jain et al. | ......................... 341/50 |
| 2007/0179973 | A1 * | 8/2007 | Brodie et al. | ............. 707/104.1 |

FOREIGN PATENT DOCUMENTS

| | | | |
|---|---|---|---|
| JP | 2005-234837 | A | 9/2005 |
| KR | 2001-0050111 | A | 6/2001 |
| KR | 2003-0055702 | A | 7/2003 |
| KR | 2004-0072256 | A | 8/2004 |
| KR | 2005-0066522 | A | 6/2005 |
| WO | 2006/006783 | A1 | 1/2006 |
| WO | WO2006006931 | * | 1/2006 |
| WO | 2006/031046 | A1 | 3/2006 |
| WO | WO2006080754 | * | 8/2006 |

OTHER PUBLICATIONS

Borda, "Digital rights protection—a great challenge of the new millennium", 2005, IEEE-Telecommunications in modern satellite, vol. 1, pp. 207-214.*
Office Action dated May 31, 2011 from the Japanese Patent Office in counterpart Japanese application No. 2009-509432.

* cited by examiner

*Primary Examiner* — Taghi Arani
*Assistant Examiner* — Gregory Lane
(74) *Attorney, Agent, or Firm* — Sughrue Mion, PLLC

(57) ABSTRACT

Disclosed are a method and apparatus for efficiently providing a location of a contents encryption key. A method of efficiently providing a location of a contents encryption key according to an embodiment of the present invention includes generating metadata containing information regarding a location of a contents encryption key in a rights object, and setting the generated metadata and the rights object in a portable storage device.

21 Claims, 5 Drawing Sheets

FIG. 1

Rights Object

```
<o-ex:rights
xmlns:o-ex=" http://odrl.net/1.1/ODRL-EX"
xmlns:o-dd=" http://odrl.net/1.1/ODRL-DD"
xmlns:oma-dd=" http://www.openmobilealliance.com/oma-dd"
xmlns:ds=" http://www.w3.org/2000/09/xmldsig#"
xmlns:xenc=" http://www.w3.org/2001/04/xmlenc#"
o-ex:id=" C.1">
 <o-ex:context>
   <o-dd:version>2.0</o-dd:version>
   <o-dd:uid>RightsObjectID</o-dd:uid>
 </o-ex:context>
 <o-ex:agreement>
  ① <o-ex:asset>
     <o-ex:context>
     ② <o-dd:uid>ContentID</o-dd:uid>
     </o-ex:context>
     <o-ex:digest>
       <ds:DigestMethod Algorithm=" http://www.w3.org/2000/09/xmldsig#sha1"/>
       <ds:DigestValue>DCFHash</ds:DigestValue>
     </o-ex:digest>
     <ds:KeyInfo>
       <xenc:EncryptedKey>
         <xenc:EncryptionMethod Algorithm=" http://www.w3.org/2001/04/xmlenc#kw-aes128"/>
         <ds:KeyInfo>
           <ds:RetrievalMethod URI=" REKReference" />
         </ds:KeyInfo>
         <xenc:CipherData> ③
           <xenc:CipherValue>EncryptedCEK</xenc:CipherValue>
         </xenc:CipherData>
       </xenc:EncryptedKey>
     </ds:KeyInfo>
   </o-ex:asset>
   <o-ex:permission>
     <o-dd:play/>
   </o-ex:permission>
 </o-ex:agreement>
</o-ex:rights>
```

FIG. 2

Metadata

```
CID#1      address of CEK#1
CID#2      address of CEK#2
...
CID#n      address of CEK#n
```

Rights Object

```
<o-ex:rights
......
   <o-ex:asset>
     <o-ex:context>......  111
        <o-dd:uid>CID#1</o-dd:uid>      112
     </o-ex:context>

<xenc:CipherData>   ......
           <xenc:CipherValue>CEK#1</xenc:CipherValue>
        </xenc:CipherData>
                                         121
     <o-ex:context>......
        <o-dd:uid>CID#2</o-dd:uid>
     </o-ex:context>         122

<xenc:CipherData>   ......
           <xenc:CipherValue>CEK#2</xenc:CipherValue>
        </xenc:CipherData>
      ......             131
     <o-ex:context>......
        <o-dd:uid>CID#n</o-dd:uid>
     </o-ex:context>          132

<xenc:CipherData>   ......
           <xenc:CipherValue>CEK#n</xenc:CipherValue>
        </xenc:CipherData>
     ......
   </o-ex:asset>
......
<o-ex:rights>
```

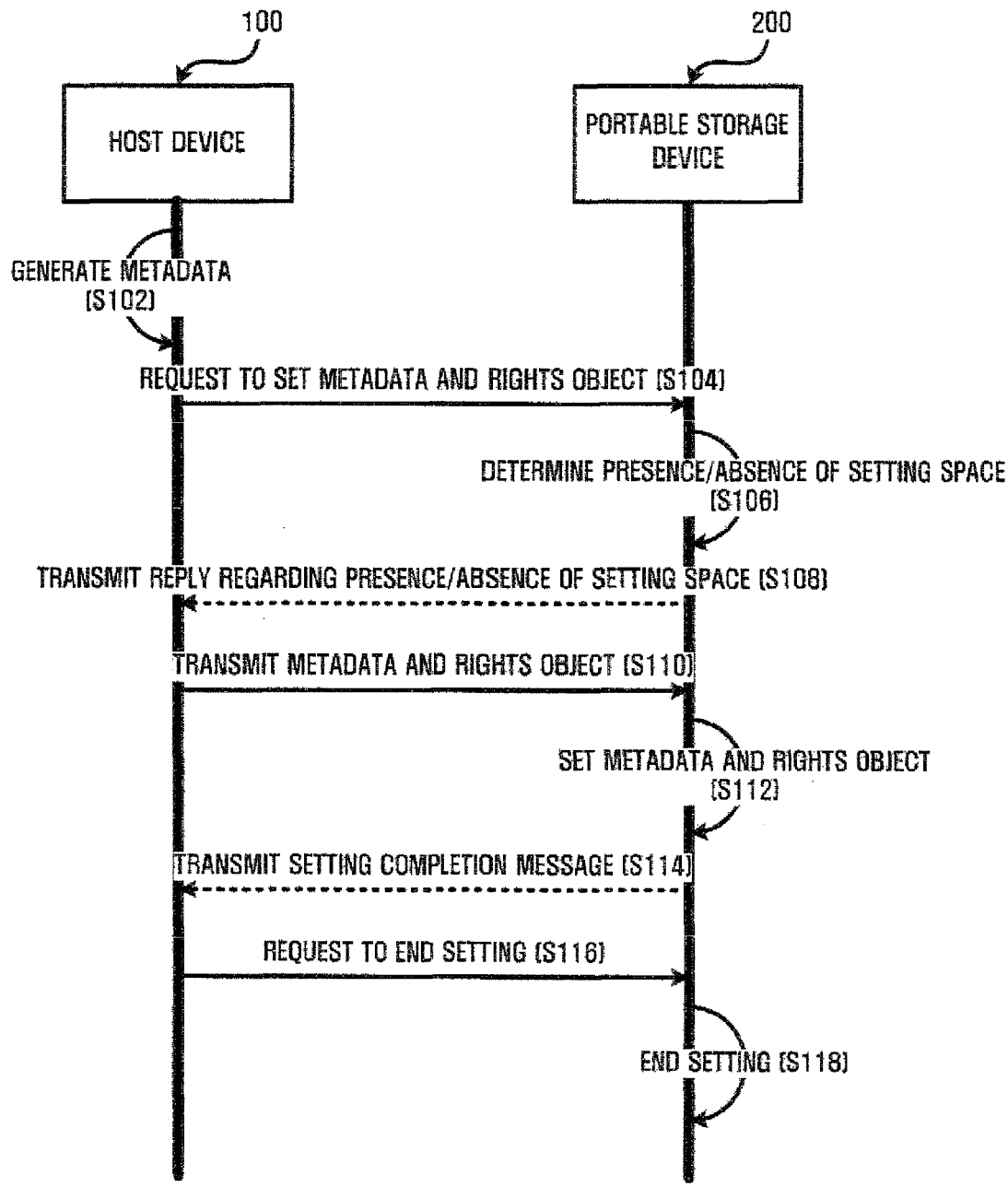

METHOD AND APPARATUS FOR EFFICIENTLY PROVIDING LOCATION OF CONTENTS ENCRYPTION KEY

CROSS REFERENCE TO RELATED APPLICATION

This application claims priority from U.S. Provisional Application No. 60/799,652 filed on May 12, 2006 in the USPTO and Korean Patent Application No. 10-2007-0037396 filed on Apr. 17, 2007 in the Korean Intellectual Property Office, the disclosure of which is incorporated herein by reference in its entirety.

BACKGROUND OF THE INVENTION

1. Field of the Invention

The present invention relates to a digital rights management technology. In particular, the present invention relates to a method and apparatus for efficiently providing a location of a contents encryption key by storing a rights object in a secure multimedia card together with metadata regarding the location of the contents encryption key.

2. Description of the Related Art

Digital rights management (hereinafter, referred to as "DRM") has been actively studied, and commercial services, to which DRM is applied, have been introduced or are being introduced. DRM is a technical concept to protect digital contents from unauthorized copying and distribution. In the related art, efforts to protect digital contents have been taken, but they have focused on preventing an unauthorized access to the digital contents. For example, an access to the digital contents is permitted to only a user who pays a fee, while a user who does not pay the fee cannot access the digital contents. However, because of the characteristic of digital data, the digital contents can be easily reused, processed, copied, and distributed. Accordingly, if a user who pays a fee and accesses the digital contents copies or distributes the digital contents without authorization, a user who does not pay the fee can use the digital contents. In order to solve this problem, according to the DRM, the digital content is distributed in an encrypted state. In order for a user to use the encrypted digital contents, a license called a rights object (RO) is needed.

Meanwhile, a rights object stored in a host device is moved or copied to a portable storage device. A portable storage device, such as an XD card or a multimedia card, is easily attached and detached to and from a host device, such as a cellular phone, a computer, or a digital camera. The portable storage device does not have the technical limitation in a known hard disk or compact disk. That is, it not only stores data but performs a computing function, such as data control or arithmetic. In addition, a new portable storage device, to which a security function is added to protect digital rights through digital contents storage and transmission/reception, has been developed. Accordingly, the DRM can be used between the portable storage device and the host device. That is, the rights object can be stored in the portable storage device, and the host device can play the encrypted contents using the rights object stored in the portable storage device.

FIG. 1 is an exemplary view showing a process of searching a contents encryption key in a rights object according to the related art. The rights object shown in FIG. 1 can describe rights regarding one or more contents. In order to acquire a contents encryption key of user-desired contents, first, a contents describing portion in the rights object is searched. This corresponds to a portion ① from <o-ex:context> to <o-ex:permission>, which is indicated by a box in FIG. 1. Next, contents identification information (Contents ID) corresponding to the user-desired contents is searched in the contents describing portion ① indicated by the box. This corresponds to a portion ② from <o-dd:uid>ContentID</o-dd:uid> to </o-ex:asset>, which is indicated by another box in FIG. 1. Finally, the contents encryption key is searched in a portion where the searched contents identification information is described. This corresponds to a portion ③ where EncryptedCEK is displayed.

However, the process of searching a contents encryption key in a rights object according to the related art has the following problems.

First, even if a specific contents encryption key in the rights object is needed, the rights object may need to be parsed in full until a contents encryption key corresponding to contents identification information is found.

Second, in order to parse the rights object, a parser for a language that describes the corresponding rights object may be needed.

Third, similarly to the play back of contents, when a contents encryption key needs to be extracted in real time, a response speed may be lowered due to unnecessary parsing of the rights object.

Fourth, when a low-performance device, such as a secure multimedia card, follows the above-described search process in order to acquire the contents encryption key of the rights object, it may take a lot of time to parse the rights object, and performance may be degraded.

SUMMARY OF THE INVENTION

The present invention has been finalized in order to solve the above-described problems. An aspect of the present invention is to provide a method and apparatus for efficiently providing a location of a contents encryption key that can rapidly and efficiently search a contents encryption key in a rights object by creating information regarding a location of a contents encryption key in a rights object, which describes digital rights, as additional metadata and setting the created metadata together with the rights object.

Aspects of the present invention are not limited to those mentioned above, and other aspects of the present invention will be apparently understood by those skilled in the art through the following description.

According to an aspect of the present invention, there is provided a method of efficiently providing a location of a contents encryption key, the method including generating metadata containing information regarding a location of a contents encryption key in a rights object, and setting the generated metadata and the rights object in a portable storage device.

The method according to the aspect of the present invention may further include searching the contents encryption key using the generated metadata.

According to another aspect of the present invention, there is provided an apparatus for efficiently providing a location of a contents encryption key, the apparatus including a metadata generation unit generating metadata containing information regarding a location of a contents encryption key in a rights object, and a setting unit setting the generated metadata and the rights object in a portable storage device.

The apparatus according to another aspect of the present invention may further include a search unit searching the contents encryption key using the generated metadata.

BRIEF DESCRIPTION OF THE DRAWINGS

The above and other features and advantages of the present invention will become more apparent by describing in detail preferred embodiments thereof with reference to the attached drawings in which:

FIG. 1 is an exemplary view showing a process of searching a contents encryption key in a rights object according to the related art;

FIG. 2 is a diagram showing the configuration of a rights object according to an exemplary embodiment of the present invention and metadata containing information regarding a location of a contents encryption key in the rights object;

FIG. 3 is an exemplary view showing a process of setting a rights object and metadata according to an exemplary embodiment of the present invention;

DESCRIPTION OF EXEMPLARY EMBODIMENTS

Figure 4:
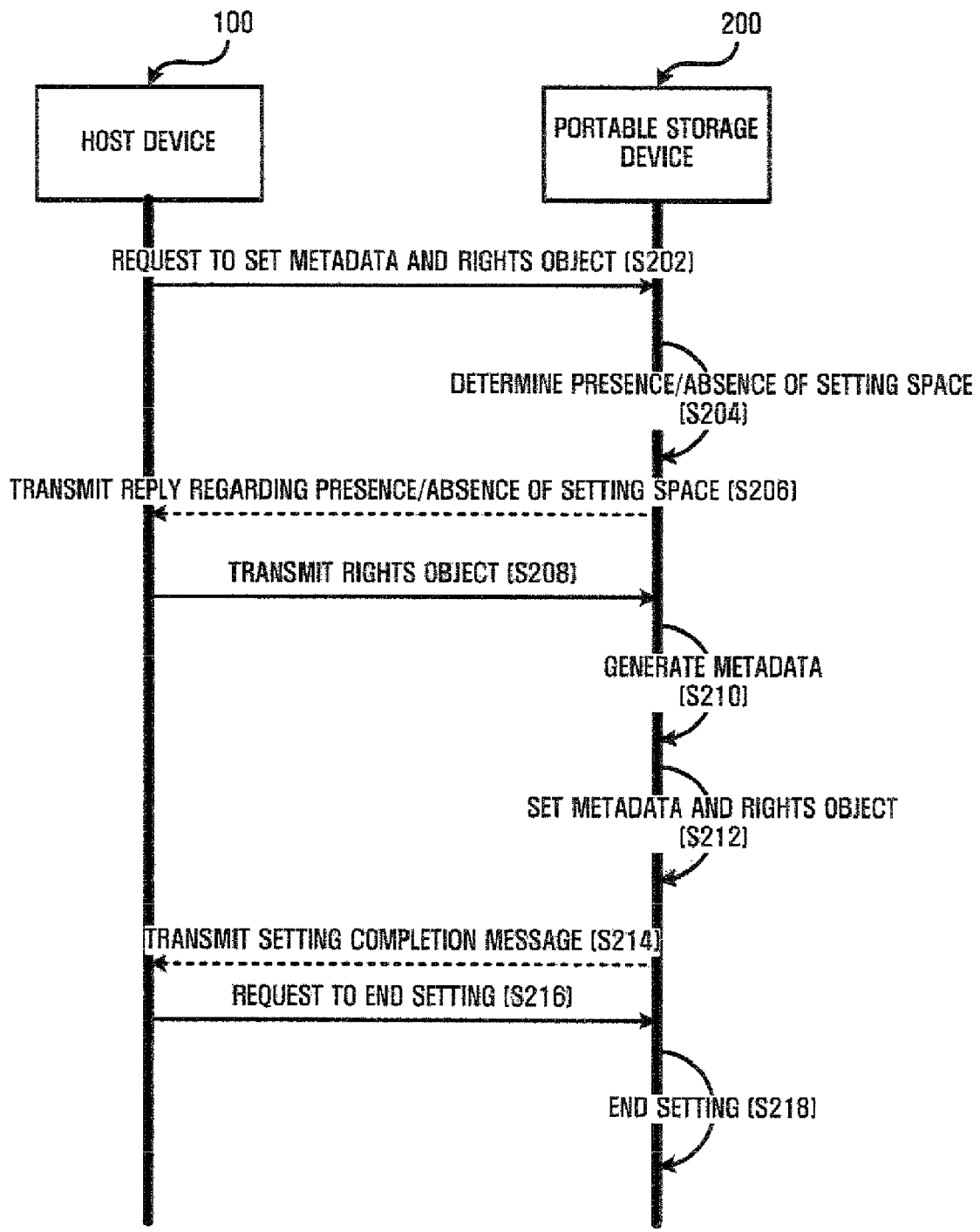
FIG. 4 is an exemplary view showing a process of setting a rights object and metadata according to another exemplary embodiment of the present invention.

Features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the present invention to those skilled in the art, and the present invention will only be defined by the appended claims. Like reference numerals refer to like elements throughout the specification.

Hereinafter, exemplary embodiments of the present invention will be described in detail with reference to the accompanying drawings. Before the detailed description is set forth, terms used in this specification will be briefly described. The descriptions of the terms are to be construed for providing a better understanding of the specification and are not intended to limit the technical spirit of the present invention.

DRM (Digital Rights Management)

DRM refers to technologies used by publishers or copyright owners to control access to or usage of digital contents.

Rights Object (RO)

A rights object is a type of permission to use encrypted contents. Types of permission include "Play", "Display", "Execute", "Print", "Export" (Copy or Move), and "Inspect" the encrypted contents. Examples of ROs in the present invention are the same as those defined for an OMA DRM (Open Mobile Alliance Digital Rights Management) system.

Host Device

A host device is connectable to a portable storage device and enables playing back of encrypted contents using a rights object stored in the portable storage device. Exemplary host devices are portable multimedia devices, such as cellular phones, PDAs, or MP3 players, or fixed multimedia devices, such as computers or digital TVs.

Portable Storage Device

A portable storage device includes a nonvolatile memory, such as a flash memory, which data can be written to, read from, and deleted from, which has a data arithmetic function, and which can be connected/disconnected to/from a host device. Examples of such a portable storage device include smart media, memory sticks, compact flash (CF) cards, XD cards, and multimedia cards. In the exemplary embodiments of the present invention, the portable storage device may be a secure multimedia card (secure MMC) having a predetermined security function.

Contents Encryption Key (CEK)

The contents encryption key is a key to be used to decode encrypted contents and exists in the rights object in an encrypted state.

CID (Contents ID)

CID means identification information of contents to be executed by the host device.

FIG. 2 is a diagram showing the configuration of a rights object according to an embodiment of the present invention and metadata containing information regarding a location of a contents encryption key in the rights object.

The rights object shown in FIG. 2 is an example to assist understanding and describes rights regarding one or more DRM contents according to Rights Expression Language of OMA DRM 2.0. However, the rights object that is used herein is not limited to OMA DRM 2.0.

Referring to FIG. 2, it can be seen that information regarding a location of a contents encryption key in a rights object is extracted as additional metadata. The schema of the rights object includes contents identification information (Contents ID; CID) and a contents encryption key (CEK). FIG. 2 shows identification information CID#1 111 of first contents and a contents encryption key CEK#1 112 thereof, identification information CID#2 121 of second contents and a contents encryption key CEK#2 122 thereof, and identification information CID#n 131 of n-th contents and a contents encryption key CEK#n 132 thereof.

When a contents encryption key is searched using the method shown in FIG. 1, the rights object needs to be parsed in full until a contents encryption key of identification information of desired contents is found, and a parser for a language that describes the corresponding rights object is needed. In order to solve these problems, the inventors have found that, if metadata, which provides information regarding a location of a contents encryption key in a rights object in association with corresponding contents identification information is set separately from the rights object, the location of the contents encryption key to be used to play the contents can be easily and efficiently searched. Further, it has been found that, as the number of contents described in the rights object is increased, the search can be more efficiently performed. Referring to FIG. 2, it can be seen that identification information of one or more contents and information regarding the location of the corresponding contents encryption key are generated as metadata, in addition to the schema of the rights object.

Meanwhile, when single contents are managed by the rights object and also a single contents encryption key exists, that is, when no different contents encryption key exists, metadata may contain only the information regarding the location of the contents encryption key without containing contents identification information.

Here, the information regarding the location of the contents encryption key may be expressed by various methods. In the embodiments of the present invention, it can be expressed using the number of bytes from the beginning of the rights object to the location of the corresponding contents encryption key.

A process of generating and setting metadata will now be described. Hereinafter, a description will be given by way of a host device as a high-performance device and a portable storage device as a low-performance device, but this is not intended to limit the scope of protection of the present invention.

FIG. 3 is an exemplary view showing a process of setting a rights object and metadata according to an embodiment of the present invention. In the embodiment shown in FIG. 3, a host device 100 generates metadata, and a portable storage device 200 sets metadata and a rights object.

First, the host device 100 generates metadata containing information regarding a location of a contents encryption key (S102). As described above with reference to FIG. 2, the metadata also contains contents identification information (CID) corresponding to the information regarding the location of the contents encryption key.

After generating the metadata, the host device 100 requests the portable storage device 200 to set the metadata and the rights object (S104). The portable storage device 200 that is requested to set the metadata and the rights object determines presence/absence of a setting space of the metadata and the rights object (S106), and sends the determination result as a reply to the host device 100 (S108). If the host device 100 receives a reply purporting that the setting space exists, the host device transmits the metadata and the rights object to the portable storage device 200 (S110). The portable storage device 200 that receives the metadata and the rights object sets the metadata and the rights object (S112). At this time, the metadata and the rights object may be set together or in different storage spaces.

If the portable storage device 200 completes the setting, the portable storage device 200 transmits a setting completion message to the host device 100 (S114). The host device 100 that receives the setting completion message requests the portable storage device 200 to end the setting (S116). Then, the portable storage device 200 ends the setting (S118).

If the setting of the metadata and the rights object is completed, the portable storage device 200 can search the contents encryption key using the information regarding the location of the contents encryption key in the metadata.

FIG. 4 is an exemplary view showing a process of setting a rights object and metadata according to another exemplary embodiment of the present invention. In the embodiment shown in FIG. 4, the portable storage device 200, not the host device 100, generates the metadata. Further, the portable storage device 200 sets the metadata and the rights object.

First, the host device 100 requests the portable storage device 200 to set the metadata and the rights object (S202). The portable storage device 200 that is requested to set the metadata and the rights object determines presence/absence of the setting space of the metadata and the rights object (S204), and sends the determination result as a reply to the host device 100 (S206).

The host device 100 that receives a reply purporting that the setting space exists transmits the rights object to the portable storage device 200 (S208). The portable storage device 200 that receives the rights object generates the metadata containing the information regarding the location of the contents encryption key in the rights object (S210). Once the metadata is generated, the portable storage device 200 does not need to generate the metadata again. Next, the portable storage device 200 sets the generated metadata and the received rights object (S212).

When the portable storage device 200 completes the setting, the portable storage device 200 transmits the setting completion message to the host device 100 (S214). Then, if the host device 100 requests the portable storage device 200 to end the setting according to the setting completion message (S216), the portable storage device 200 ends the setting (S218).

Similarly to the embodiment of FIG. 3, if the setting is completed, the portable storage device 200 can search the contents encryption key using the information regarding the location of the contents encryption key in the metadata.

Figure 5:
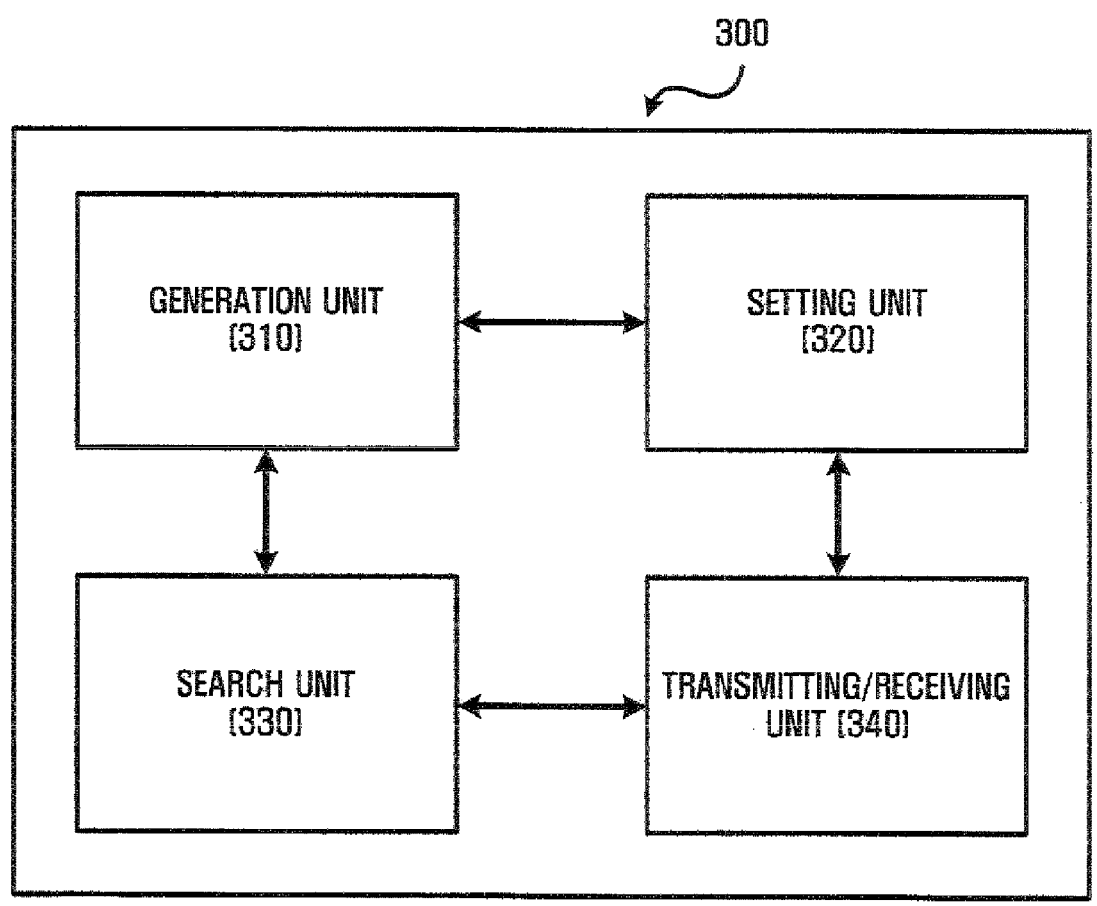
FIG. 5 is a block diagram showing an apparatus for efficiently providing a location of a contents encryption key according to an exemplary embodiment of the present invention.

FIG. 5 is a block diagram showing an apparatus for efficiently providing a location of a contents encryption key according to an embodiment of the present invention.

The term "unit" used herein, that is, "module" or "table", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. The functionality provided for in the components and modules may be combined into fewer components and modules or further separated into additional components and modules. In addition, the components and modules may be implemented to execute one or more central processing units (CPUs) in a device.

Referring to FIG. 5, an apparatus for efficiently providing a location of a contents encryption key 300 includes a generation unit 310, a setting unit 320, a search unit 330, and a transmitting/receiving unit 340.

The generation unit 310 generates metadata information regarding the location of the contents encryption key in the rights object and contents identification information corresponding to the information regarding the location. The generation unit 310 may generate the metadata in the host device 100 or the portable storage device 200. When the host device 100 requests the portable storage device 200 to set the metadata and the rights object, the generation unit 310 generates the metadata in the portable storage device 200.

The setting unit 320 sets the generated metadata and the rights object in the portable storage device 200. When the host device 100 requests the portable storage device 200 to set the metadata and the rights object, the setting unit 320 sets the metadata and the rights object in the portable storage device 200.

The search unit 330 searches a contents encryption key in the rights object using the generated metadata.

The transmitting/receiving unit 340 transmits only the rights object or the metadata and the rights object from the host device 100 to the portable storage device 200. When the transmitting/receiving unit 340 transmits a request message to end the setting from the host device 100 to the portable storage device 200, the setting unit 320 ends the setting according to the request.

It is apparent to those skilled in the art that the scope of protection of the method of efficiently providing a location of a contents encryption key according to an embodiment of the present invention covers a computer-readable recording medium having recorded thereon program codes for executing the method as described above.

Although the present invention has been described in connection with the exemplary embodiments of the present invention, it will be apparent to those skilled in the art that various modifications and changes may be made thereto without departing from the scope and spirit of the present invention. Therefore, it should be understood that the above embodiments are not limitative, but illustrative in all aspects.

According to the above-described embodiments of the present invention, the following effects can be obtained.

The information regarding the location of the contents encryption key in the rights object, which describes the digital rights, is created as additional metadata and set together with the rights object. Therefore, the contents encryption key in the rights object can be rapidly and efficiently searched.

Further, the portable storage device that stores the rights object does not necessarily need a parser for a language that describes the right object. Therefore, an additional resource is not requested by the portable storage device.

In addition, since the contents encryption key in the rights object is rapidly extracted, a response speed is increased during the play back of the contents.

Effects of the present invention are not limited to those mentioned above, and other effects of the present invention will be understood by those skilled in the art through the appended claims.

What is claimed is:

1. A method of providing a location of a contents encryption key, the method comprising:
   generating metadata, which is used to search a rights object, containing information regarding a location of a contents encryption key in the rights object; and
   setting the generated metadata and the rights object in a portable storage device,
   wherein the generated metadata is set separately from the rights object,
   wherein the information regarding the location of the contents encryption key is displayed using a number of bytes between the beginning of the rights object and the location of the contents encryption key,
   wherein the generating of the metadata comprises causing a host device, which plays contents according to rights described in the rights object, to generate the metadata.

2. The method of claim 1, further comprising:
   searching the contents encryption key using the generated metadata.

3. The method of claim 1, wherein, when two or more contents are described in the rights object, the metadata further contains contents identification information corresponding to the information regarding the location of the contents encryption key.

4. The method of claim 1, wherein the setting of the metadata and the rights object comprises:
   causing the host device to request the portable storage device to set the metadata and the rights object;
   causing the portable storage device to determine presence/absence of a setting space of the metadata and the rights object according to the request, and to reply the determination result to the host device;
   when the host device receives a reply purporting that the setting space is present, transmitting the metadata and the rights object to the portable storage device; and
   causing the portable storage device to set the metadata and the rights object.

5. The method of claim 4, wherein the setting of the metadata and the rights object further comprises:
   when the portable storage device completes the setting, transmitting a setting completion message to the host device;
   when the host device requests the portable storage device to end the setting according to the setting completion message, causing the portable storage device to end the setting.

6. The method of claim 1, wherein the generating metadata comprises:
   causing the host device, which plays contents according to rights described in the rights object, to request the portable storage device to set the metadata and the rights object;
   causing the portable storage device to determine presence/absence of a setting space of the metadata and the rights object according to the request, and to reply the determination result to the host device;
   when the host device receives a reply purporting that the setting space is present, transmitting the rights object to the portable storage device; and
   causing the portable storage device to generate the metadata regarding the received rights object.

7. The method of claim 6, wherein the setting of the metadata and the rights object comprises causing the portable storage device to set the generated metadata and the received rights object.

8. The method of claim 7, wherein the setting of the metadata and the rights object comprises:
   when the portable storage device completes the setting, transmitting a setting completion message to the host device; and
   when the host device requests the portable storage device to end the setting according to the setting completion message, causing the portable storage device to end the setting.

9. An apparatus for efficiently providing a location of a contents encryption key, the apparatus comprising:
   a metadata generation unit which generates metadata, which is used to search a rights object, containing information regarding a location of a contents encryption key in the rights object; and
   a setting unit which sets the generated metadata and the rights object in a portable storage device,
   wherein the generated metadata is set separately from the rights object,
   wherein the information regarding the location of the contents encryption key is displayed using a number of bytes between the beginning of the rights object and the location of the contents encryption key,
   wherein the generation unit causes a host device, which plays contents according to rights described in the rights object, to generate the metadata.

10. The apparatus of claim 9, further comprising:
    a search unit which searches the contents encryption key using the generated metadata.

11. The apparatus of claim 9, wherein, when two or more contents are described in the rights object, the metadata further contains contents identification information corresponding to the information regarding the location of the contents encryption key.

12. The apparatus of claim 9, wherein, when the host device requests the portable storage device to set the metadata and the rights object, the setting unit sets the metadata and the rights object according to the request.

13. The apparatus of claim 9, further comprising:
    a transceiving unit, when a setting space is present, transmitting the metadata and the rights object from the host device to the portable storage device.

14. The apparatus of claim 13, wherein, when the transceiving unit transmits a request message to end the setting from the host device to the portable storage device, the setting unit ends the setting according to the request.

15. The apparatus of claim 9, wherein, when a host device, which plays contents according to rights described in the rights object, requests the portable storage device to set the metadata and the rights object, the generation unit generates the metadata in the portable storage device according to the request.

16. The apparatus of claim 15, further comprising:
a transceiving unit, when a setting space is present, transmitting the rights object from the host device to the portable storage device,
wherein the generation unit generates the metadata regarding the received rights object in the portable storage device.

17. The apparatus of claim 15, wherein the setting unit sets the generated metadata and the rights object transmitted from the host device in the portable storage device.

18. The apparatus of claim 17, wherein, when the transceiving unit transmits a request message to end the setting from the host device to the portable storage device, the setting unit ends the setting.

19. A non-transitory computer-readable recording medium having recorded thereon program codes to be executed by a computer for executing a method of providing a location of a contents encryption key, the method comprising:

generating metadata, which is used to search a rights object, containing information regarding a location of a contents encryption key in the rights object; and
setting the generated metadata and the rights object in a portable storage device,
wherein the generated metadata is set separately from the rights object,
wherein the information regarding the location of the contents encryption key is displayed using the number of bytes between the beginning of the rights object and the location of the contents encryption key,
wherein the generating of the metadata comprises causing a host device, which plays contents according to rights described in the rights object, to generate the metadata.

20. The method according to claim 1, wherein the information regarding the location of the contents encryption key comprises an address of the contents encryption key.

21. The method according to claim 1, wherein the rights object comprises a type of permission to use encrypted content.

\* \* \* \* \*